US007484961B2

(12) United States Patent
Blaski et al.

(10) Patent No.: US 7,484,961 B2

(45) Date of Patent: Feb. 3, 2009

(54) AQUATIC STABILIZER APPARATUS

(75) Inventors: David R. Blaski, St. John, IN (US); Kevin P. Blaski, Griffith, IN (US)

(73) Assignee: Medical Devices, LLC, Highland, IN (US)

( * ) Notice: Subject to any disclaimer, the term of this patent is extended or adjusted under 35 U.S.C. 154(b) by 685 days.

(21) Appl. No.: 11/202,295

(22) Filed: Aug. 12, 2005

(65) Prior Publication Data

US 2007/0037670 A1 Feb. 15, 2007

(51) Int. Cl.
*G09B 19/00* (2006.01)

(52) U.S. Cl. ...................................... 434/247; 434/254

(58) Field of Classification Search ................. 434/247, 434/254, 255; 482/111; 441/55, 60
See application file for complete search history.

(56) References Cited

U.S. PATENT DOCUMENTS

| | | | | | |
|---|---|---|---|---|---|
| 1,329,660 | A | * | 2/1920 | John | 441/59 |
| 1,909,259 | A | * | 5/1933 | Feir | 441/60 |
| 4,411,422 | A | | 10/1983 | Solloway | |
| 4,867,720 | A | * | 9/1989 | Harrington | 441/60 |
| 4,881,532 | A | | 11/1989 | Borig et al. | |
| 5,092,589 | A | * | 3/1992 | Packer | 482/92 |
| 5,244,393 | A | * | 9/1993 | Perry | 434/254 |
| 5,344,390 | A | | 9/1994 | Motloch | |
| 5,362,305 | A | | 11/1994 | Varn | |
| 5,421,810 | A | | 6/1995 | Davis et al. | |
| 5,556,373 | A | | 9/1996 | Motloch | |
| 5,601,514 | A | * | 2/1997 | Horn | 482/55 |
| 5,700,173 | A | * | 12/1997 | Lerro | 441/57 |
| D403,071 | S | | 12/1998 | Biedermann et al. | |
| 6,056,613 | A | * | 5/2000 | Pike | 441/129 |
| 6,129,689 | A | | 10/2000 | Dibello | |
| 6,203,511 | B1 | | 3/2001 | Johnson et al. | |
| 6,540,703 | B1 | | 4/2003 | Lerman | |
| 6,589,195 | B1 | | 7/2003 | Schwenn et al. | |
| 6,736,567 | B1 | | 5/2004 | Dibello | |
| 7,104,932 | B1 | * | 9/2006 | Brentlinger | 482/57 |
| 7,175,569 | B1 | * | 2/2007 | Lan et al. | 482/55 |

* cited by examiner

*Primary Examiner*—Kurt Fernstrom

(57) ABSTRACT

An aquatic stabilizing apparatus for use in therapeutic environments is presented. The invention comprises a buoyant, lightweight orthotic apparatus having a waistband having a handle for use by a therapist, bilateral upper leg rods, knee attachment members for reversibly affixing the upper leg rods to a patient, and, optionally, bilateral lower leg extension rods and ankle attachment members.

21 Claims, 5 Drawing Sheets

AQUATIC STABILIZER APPARATUS

TECHNICAL FIELD

The present invention relates to orthotic devices for use in therapeutic environments and more particularly to an orthotic device for use in aquatic therapeutic environments.

BACKGROUND OF THE INVENTION

Orthotic devices are essentially braces used in various configurations and are intended to offer stability to individuals suffering from various disorders, such as neuromuscular disorders such as seen in cerebral palsy or acquired disorders such as seen after a traumatic event. They are used in a multitude of environments. Frequently, they are employed in therapeutic environments to assist in, for example, gait, flexibility and strength training.

Most times therapy is provided in a land based environment. There are many devices employed by health care professionals to assist patients in the land based therapeutic environment, including orthotics that provide the necessary stability and control necessary to offer therapeutic advantages.

Increasingly however, aquatic based therapies are seen as the treatment of choice for patients. Aquatic therapy provides a partial weight-bearing environment that enables increasing ambulating, flexibility and strength, and decreasing pain that land based therapy cannot provide. Therapists using aquatic therapy for their patients, until now, have had to place their hands around a patient's waist or hold onto their hands to offer the patient stability and guidance. This has limited the potential for patient outcomes since it often difficult, if not impossible, for a therapist to hold a patient safely, guide the patient, and at the same time position the patient for good body mechanics.

Therapists try to use various tools, such as kick boards or "noodles" but these devices only offer a partial solution: they offer buoyancy but not stability. Traditional ground based therapy orthotic devices are too bulky, heavy and their material absorbs water (read: will not float) to be used in aquatic therapy.

Accordingly, many therapists who would otherwise use aquatic therapy with their patients turn away from the therapy. There is need, therefore, for an orthotic device that can be safely and effectively used in aquatic therapy environments. The device should offer ease of use, be lightweight and buoyant, provide patient stability, and enable the therapist to guide the patient and simultaneously provide good body mechanics. The present invention provides such a solution.

OBJECTS AND ADVANTAGES OF THE PRESENT INVENTION

It is an object of the present invention to provide an orthotic apparatus for use in an aquatic environment.

It is a further object of the present invention to provide an aquatic based orthotic device that can be safely and effectively used in aquatic therapy environments.

It is a further object of the present invention to provide an aquatic stabilizing apparatus that is buoyant.

It is yet a further object of the present invention to provide an aquatic stabilizing apparatus that offer stability to a patient while in the water.

It is another object of the present invention to provide an aquatic stabilizing apparatus that provides good body mechanic opportunities for the patient.

It is yet a further object of the present invention to provide an aquatic stabilizing apparatus that enables a therapist to guide a patient while the patient is in the water.

It is yet another object of the present invention to provide an aquatic stabilizer apparatus that enables flexibility in sizing to a patient and customization for body mechanic purposes.

It is an advantage of the present invention that therapists and patients can use aquatic therapy modalities more safely and efficiently, thereby offering the opportunity for increased use of such modalities and better patient outcomes, which all leads to a better patient quality of life. The above objects and advantages are provided for in the present inventive aquatic stabilizer apparatus.

SUMMARY OF THE INVENTION

The above objects and advantages are provided for the present inventive aquatic stabilizer apparatus. According to the invention, an orthotic device for use in aquatic therapy treatment is presented. The apparatus has a waistband made, preferable, of a lightweight, semi-rigid, buoyant material. The waistband should be of a size and configuration that it fits comfortably around a patient's waist. In the preferred embodiment, the waistband is made of molded plastic and is fitted with adjustment features for sizing to a particular patient. The adjustment features may include the use of pads made of water suitable material, such as neoprene. The waistband is held in place around a patient's waist via a releasable closure, such as Velcro®.

Affixed to the outer sides of the waistband is at least one upper leg rod. The upper leg rod has a first end and a second end. The first end is affixed to the waistband in, preferably, a rotatable manner so that it can be adjusted to the needs of the patient. The upper leg rod extents from the waistband to the knee. Near the knee is found the second end of the upper leg rod which has affixed to it a knee attachment member for reversibly attaching the upper leg rod to the knee. The second end further has an upper leg rod adjustment zone for sizing the upper leg length of the patient in relation to the knee attachment member and also to aid in the positioning of the patient's extremity for improved body mechanics.

The upper leg rod is preferably made of a rigid, bendable, lightweight material. In the preferred embodiment, aluminum is contemplated. In the preferred embodiment, the upper leg rod can be molded to a shape and angle, either in the factory or at the time of therapy, to improve body mechanics of a patient. Doing so assists in the muscle memory training process and can prevent the patient from "scissoring" his or her legs, as is often seen in certain disorders, such as cerebral palsy.

The inventors also contemplate at least one lower leg extension rod that can be used in appropriate treatments. The lower leg extension rod is similar to the upper leg rod but extends from the knee to mid calf or ankle. The lower leg extension rod has a lower leg extension rod adjustment zone at its second end for fitting to a patient and an ankle attachment member for reversibly affixing the lower leg extension rod to the patient' lower leg.

In the preferred embodiment, a handle is affixed to the waistband for aiding in the control and stability of a patient.

While in most cases a patient will have need for use of upper leg rods and, in appropriate circumstance, lower leg extension rods bilaterally, there may be instances in which there is need for use of a rod on only one side. The inventors contemplate that in these circumstances, the unneeded rods can be removed.

There has been outlined, rather broadly, the more important features of the invention in order that the detailed description thereof that follows may be better understood, and in order that the present contribution to the art may be better appreciated. There are, of course, additional features of the invention that will be described hereinafter and that will form the subject matter of the invention.

For non-limiting example, the upper and lower leg rods can be made of plastic or there may be times in which there is no need for a handle, which can then be removed or eliminated.

As such, those skilled in the art will appreciate that the conception, upon which this disclosure is based, may readily be utilized as a basis for designing of other structures, methods, and systems for carrying out the several purposes of the present invention. It is important, therefore, that the claims be regarded as including such equivalent constructions in so far as they do not depart from the spirit and scope of the present invention.

Further, the purpose of the abstract is to enable the US patent and trademark office and the public generally, and especially the scientists, engineers and practitioners in the art who are not familiar with the patent or legal terms or phraseology, to determine quickly from what cursory inspection the nature and essence of the technical disclosure of the application. The abstract is neither intended to define the invention of the application, which is measured by the claims, nor is it intended to be limiting as to the scope of the present invention in any way.

These together with other objects of the present invention, along with the various features of novelty which characterize the present invention, are pointed out with particularity in the claims annexed to and forming a part of this disclosure. For a better understanding of the present invention, its operating advantages and the specific objects attained by its uses, reference should be had to the accompanying drawings and descriptive matter in which there is illustrated a preferred embodiment of the present invention.

DETAILED DESCRIPTION OF THE INVENTION

Figure 1:
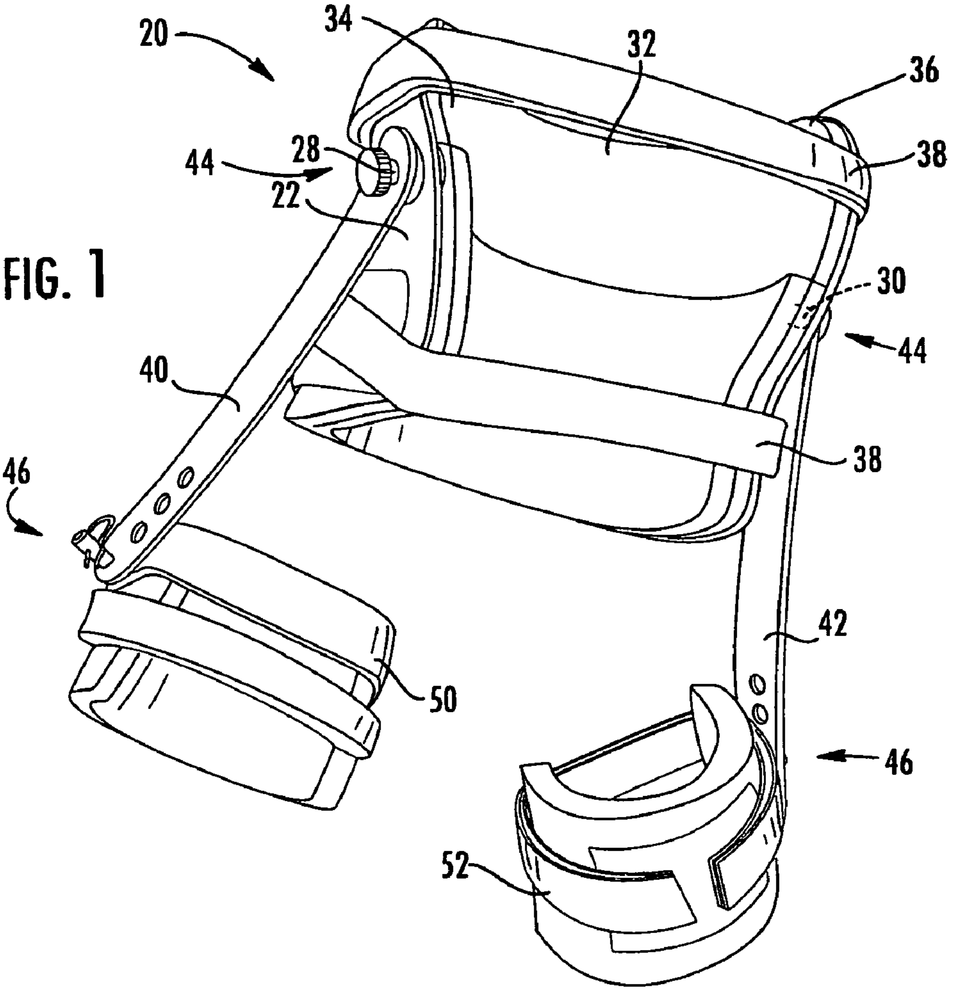
FIG. 1 is a front view of the inventive apparatus.

Before explaining the preferred embodiment of the present invention in detail, it is to be understood that the present invention is not limited in its application to the details of construction and to the arrangements of the components set forth in the following description or illustrated in the drawings. The present invention is capable of other embodiments and of being practiced and carried out in various ways. Also, it is to be understood that the phraseology and terminology employed herein are for the purpose of description and should not be regarded as limiting.

Turning to FIG. 1, a front view of the inventive aquatic stabilizing brace (throughout this disclosure generally referred to as "apparatus") 20. Apparatus 20 has a has a waistband 22 which is sized according to generally accepted therapeutic principles so that it fits comfortable about a patient's waist. Waistband 22 should preferably extend over a patient's hip towards the foot so that upper leg rods 24, 26 can be affixed at generally the position of a patient' hip joint at hip attachment 28, 30. Waistband 22 is made, preferable, of a lightweight, semi-rigid, buoyant material. In the preferred embodiment, the waistband is made of molded plastic. On the interior of waistband 22 are found rear adjustment feature 32 and side adjustment features 34, 36. All of adjustment features 32, 34, 36 are used for sizing apparatus 20 to a particular patient. Various layers or thicknesses of material may be used in order to achieve a proper fit of waistband 22 to the patient. Adjustment features 32, 34, 36 should preferably be made of a water suitable material, such as neoprene, but any material may be used so long as it does not detract from the overall buoyancy of apparatus 20. Adjustment features 32, 34, 36 are held into place using a reversible securing means such as Velcro®.

Waistband 22 is secured about a patient' waist via releasable waist securing means 38. In the preferred embodiment, waistband 22 is held in place around a patient's waist via a releasable waist securing means 38 material such as Velcro®.

Figure 2:
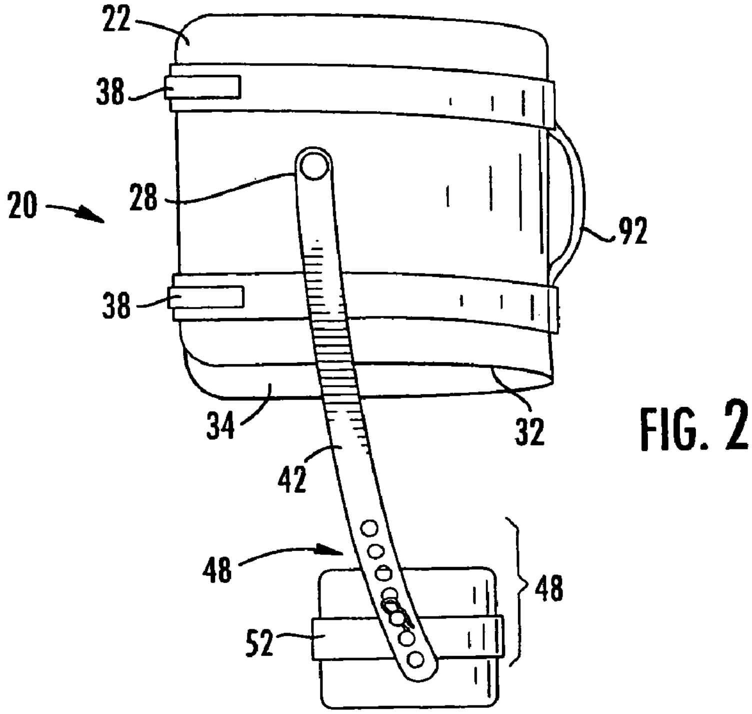
FIG. 2 is a side view of the inventive apparatus.
Figure 3:
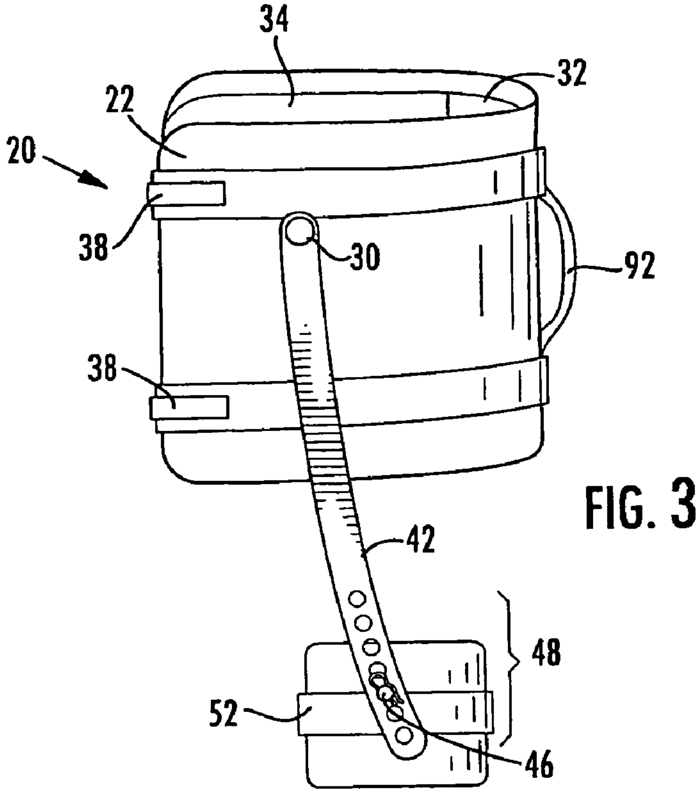
FIG. 3 is a side perspective view of the inventive apparatus.
Figure 5:
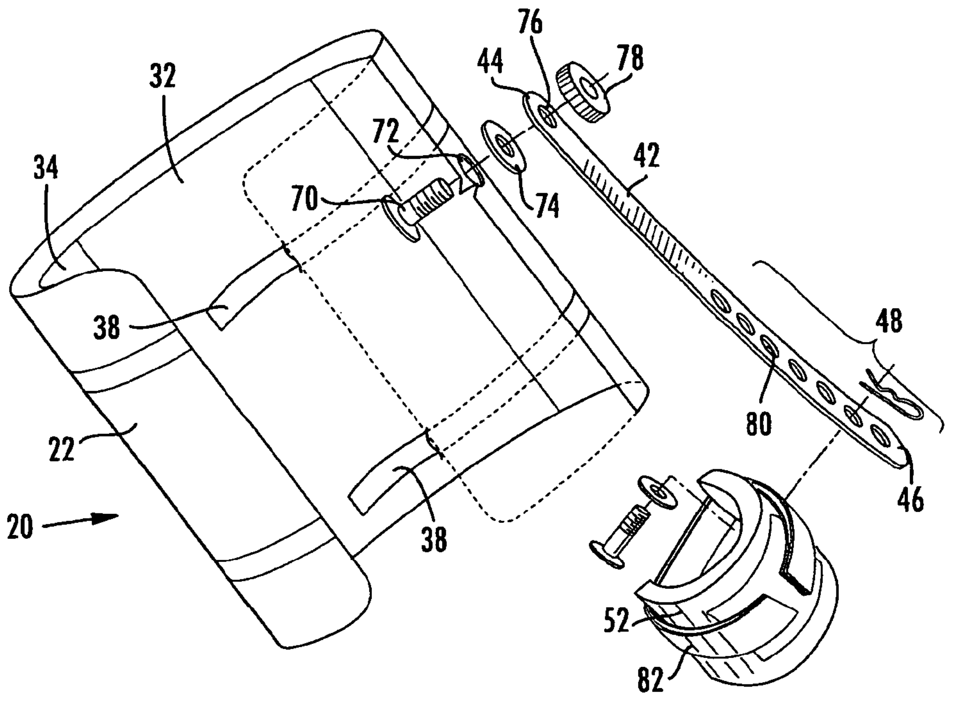
FIG. 5 is an exploded cut away side view of the inventive apparatus.

Affixed to the outer sides of the waistband are upper leg rods 40, 42. Upper leg rods 40, 42 are mirror images of one another. Unless noted otherwise, throughout this disclosure reference to a single upper leg rod is meant to include both upper leg rods 40, 42. Upper leg rods 40, 42 each have a first end 44 and a second end. Turning to FIGS. 2 and 3, it is seen that first end 40 is affixed to waistband 22 at hip attachment 28, 30 in, preferably, a rotatable manner so upper leg rods 40, 42 can be adjusted to the needs of the patient. As illustrated in FIG. 5, upper leg rods 40, 42 are pivotally affixed to waistband 22 by means of an adjustable screw and nut configuration wherein screw 70 projects through waistband hole 72, through washer 74, and upper leg rod attachment hole 76 where then upper leg rods 40, 42 are tightened into position with nut 78.

Upper leg rods 40, 42 extend from waistband 22 to the knee of the patient. At the knee, second end 46 of upper leg rods 40, 42 each have an adjustment zone 48. As seen in FIG. 5, attachment zone 48 comprises a series of attachment zone holes 80 through one of which cotter screw 82 is placed to adjust the length of the apparatus 20 for use with a patient. At upper leg rod second end 46 is placed and reversibly affixed to upper leg rod 40, 42 knee attachment members 50, 52. Adjustment zone 48 is used for placement of knee attachment members 50, 52 to size the apparatus from the patient's waist to generally the area of the patient's knee. (Please see FIG. 7 for an example of the sizing the upper leg rod attachment member).

Again referring to FIG. 5, it is seen that cotter screw 82 is projected through knee attachment member washer 84, knee attachment member hole 86, and one of attachment zone holes 80 where knee attachment member 52 is then held into position with respect to upper leg rod 42 via cotter pin 88. It is important, but not critical, to the invention that knee attachment members 50, 52 rotate freely so that during therapy, movement is not unduly restricted.

Figure 4:
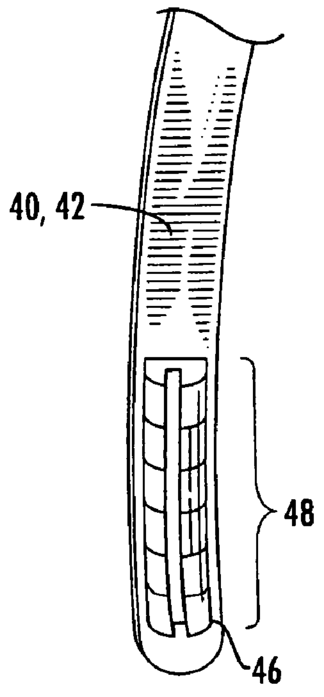
FIG. 4 is an example of an alternate adjustment zone.

As seen in FIG. 4, attachment zone 48 may have other configuration. In this non-limiting example attachment zone 48 comprises slot 90 which enables position of cotter screw 82 along its length. This Figure is presented for example purposes only and is intended to highlight only that other means of securing knee attachment members 50, 52 can be utilized.

Upper leg rods 40, 42 are preferably made of a rigid, bendable, lightweight material. In the preferred embodiment, aluminum is contemplated. In the preferred embodiment, the upper leg rod can be molded or bent, either in the factory or at the time of therapy, to improve body mechanics of a patient. Doing so assists in the muscle memory training process and can prevent the patient from "scissoring" his or her legs, as is often seen in certain disorders, such as cerebral palsy.

Figure 6:
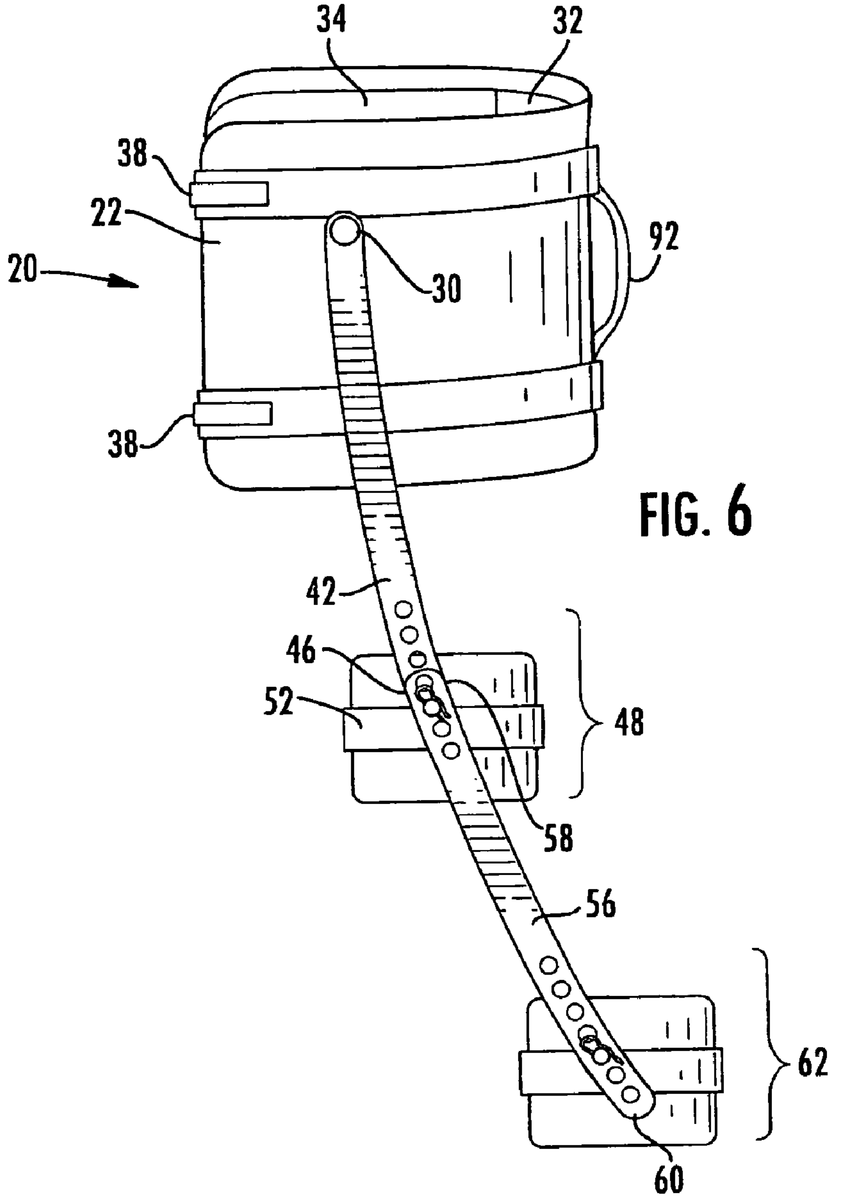
FIG. 6 is a perspective view illustrating the lower leg extension rod.

As seen in FIG. 6, the inventors also contemplate at least one lower leg extension rod 54, 56 that can be used in appropriate treatments. Lower leg extension rods 54, 56 are similar to upper leg rods 40, 42 but extend from the knee to mid calf or ankle. Lower leg extension rods 54, 56 have a first end 58 and a second end 60. First end 58 reversibly affixes to adjacent to upper leg rod second end 46. Lower leg extension rod second end 60 also has a lower leg extension rod adjustment zone 62, 64 similar to those of the upper leg rods 40, 42 for fitting to a patient and an ankle attachment members 66, 68 for reversibly affixing lower leg extension rods 54, 56 to the patient's lower leg. The configuration and attachment mechanism of lower leg extension rods 54, 56 are similar to upper leg rods 40, 42.

While in most cases a patient will have need for use of upper leg rods and, in appropriate circumstance, lower leg extension rods bilaterally, there are instances in which there is need for use of a rod on only one side. The inventors contemplate that in these circumstances, one unneeded rods can be removed.

In the preferred embodiment, a handle 92 is affixed to the waistband 22 and is used for aiding in the control and stability of a patient.

Figure 7:
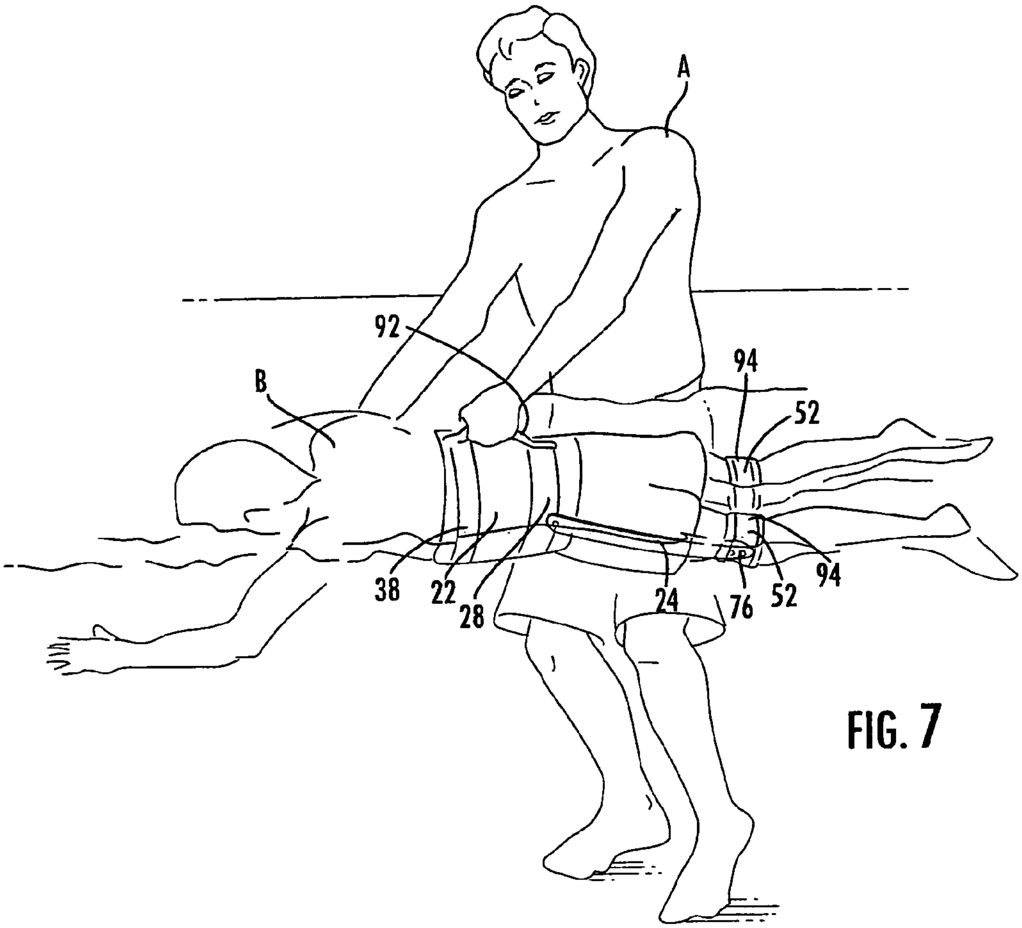
FIG. 7 is an example illustrating the inventive apparatus on a patient in a pool with a therapist.

Referring to FIG. 7, it is seen that apparatus 20, in use, has waistband 22 reversibly attached to a patient's waist via waist securing means 38. Knee attachment members 50, 53 are reversibly secured near the patient's knee using knee attachment member securing means 94 which are similar to waist securing means 38 in an appropriate position through one of Upper leg rod attachment zone holes 76.

Therapist A then can guide patient B by means of handle 92 through a series of exercises, leaving a free hand to assist the therapy. If needed, lower leg extension rods 54, 56 could be placed into position, if necessary.

It is to be understood, however, that even though numerous characteristics and advantages of the preferred and alternative embodiments have been set forth in the foregoing description, together with details of the structure and function of the embodiments, the disclosure is illustrative only, and changes may be made in detail, especially in matters of shape, size and arrangement of parts within the principles of the invention to the full extent indicated by the broad general meaning of the terms in which the appended claims are expressed.

We claim:

1. An aquatic stabilizer apparatus comprising:

a waistband made of a buoyant material;

a first upper leg rod and a second upper leg rod made of rigid material and having an upper leg rod first end and an upper leg rod second end, the first upper leg rod and second upper leg rod affixed to the waistband at the first end;

a first knee attachment member and a second knee attachment member made of a lightweight material, the first knee attachment member and second knee attachment member being affixed to the first upper leg rod and second upper leg rod, respectively, at the upper leg rod second end; and, a handle affixed to the waistband.

2. The aquatic stabilizer apparatus of claim 1 further comprising a first lower leg extension rod and a second lower leg extension rod made of a rigid material and having a lower leg extension rod first end a lower leg extension rod second end, the first and second lower leg extension rods affixed to the first and second upper leg rods, respectively, at the upper leg rod first end.

3. The lower leg extension rod of claim 2 further comprising a first ankle attachment member and a second ankle attachment member made of a lightweight material, the first ankle attachment member and second ankle attachment member being affixed to the first lower leg rod and second lower leg rod, respectively, at the lower leg rod second end.

4. The aquatic stabilizer apparatus of claim 1 further wherein the waistband has a base material that is lightweight semi rigid.

5. The waistband of claim 4 wherein the base material is plastic.

6. The aquatic stabilizer apparatus of claim 1 wherein the upper leg rod material is selected from the group of aluminum and plastic.

7. The aquatic stabilizer apparatus of claim 1 wherein the upper leg rod can be molded to an angle suitable for use with a specific patient.

8. The aquatic stabilizer apparatus of claim 2 wherein the lower leg rod material is selected from the group of aluminum and plastic.

9. An aquatic stabilizer apparatus comprising:

a waistband made of a buoyant material;

at least one upper leg rod made of rigid material and having a end and a second end, the at least one upper leg rod affixed to the waistband at the first end; and, at least one knee attachment member made of a lightweight material, the at least one knee attachment member being affixed to the at least one upper leg rod at the upper leg rod second end.

10. The aquatic stabilizer apparatus of claim 9 further comprising a handle affixed to the waistband.

11. The aquatic stabilizer apparatus of claim 9 further comprising at least one lower leg extension rod made of a rigid material and having a lower leg extension rod first end a lower leg extension rod second end, the at least one lower leg extension rod affixed to the at least one upper leg rod at the upper leg rod first end.

12. The lower leg extension rod of claim 11 wherein the lower leg extension rod is affixed to the knee attachment.

13. The at least one lower leg extension rod of claim 11 further comprising an ankle attachment member made of a lightweight material, the ankle attachment member being affixed to the at least one lower leg extension rod at the lower leg rod second end.

14. The aquatic stabilizer apparatus of claim 9 further wherein the waistband has a base material that is lightweight semi rigid.

15. The waistband of claim 14 wherein the base material is plastic.

16. The aquatic stabilizer apparatus of claim 9 wherein the upper leg rod material is selected from the group of aluminum and plastic.

17. The aquatic stabilizer apparatus of claim 9 wherein the upper leg rod can be molded to an angle suitable for use with a specific patient.

18. The aquatic stabilizer apparatus of claim 11 wherein the lower leg rod material is selected from the group of aluminum and plastic.

19. A method for aquatic therapy utilizing an aquatic stabilizing device including the steps of:

Fitting a patient with an aquatic stylizing brace, the aquatic stabilizing brace comprising a waistband made of a buoyant material; at least one upper leg rod made of rigid material and having a end and a second end, the at least one upper leg rod affixed to the waistband at the first end; and, at least one knee attachment member made of a lightweight material, the at least one knee attachment member being affixed to the at least one upper leg rod at the upper leg rod second end;

Placing the patient in an aquatic environment for therapy; and,

Performing therapeutic treatments and exercises with the patient.

20. The method of claim 18 comprising the further step of assisting the patient in the performance of therapeutic treatments and exercises by guiding the patient via a handle affixed to the waistband.

21. The method of claim 18 including the further step of utilizing at least one lower leg extension rod made of a rigid material for stabilizing a patient lower leg, the at least one lower leg extension rod further comprising an ankle attachment member made of a lightweight material.

* * * * *